(12) United States Patent
Wu

(10) Patent No.: US 10,171,701 B2
(45) Date of Patent: Jan. 1, 2019

(54) IMAGE SCANNING APPARATUS

(71) Applicant: Microtek International Inc., Hsinchu (TW)

(72) Inventor: Chin-Lai Wu, Hsinchu (TW)

(73) Assignee: MICROTEK INTERNATIONAL INC., Hsinchu (TW)

( * ) Notice: Subject to any disclaimer, the term of this patent is extended or adjusted under 35 U.S.C. 154(b) by 0 days.

(21) Appl. No.: 15/487,020

(22) Filed: Apr. 13, 2017

(65) Prior Publication Data
US 2018/0302528 A1   Oct. 18, 2018

(51) Int. Cl.
H04N 1/04 (2006.01)
H04N 1/10 (2006.01)
H04N 1/028 (2006.01)
H04N 1/387 (2006.01)

(52) U.S. Cl.
CPC ....... H04N 1/1035 (2013.01); H04N 1/02815 (2013.01); H04N 1/3876 (2013.01); H04N 2201/0081 (2013.01)

(58) Field of Classification Search
CPC ............. H04N 1/1035; H04N 1/02815; H04N 1/3876; H04N 2201/0081
USPC ........ 358/497, 474, 494, 445, 483, 493, 486
See application file for complete search history.

(56) References Cited

U.S. PATENT DOCUMENTS

| | | | | |
|---|---|---|---|---|
| 4,518,907 A * | 5/1985 | Giguere | | H02P 8/22 318/696 |
| 5,285,294 A * | 2/1994 | Takeuchi | | G06K 9/2009 358/474 |
| 5,822,087 A * | 10/1998 | Tsai | | H04N 1/1013 358/475 |
| 5,844,393 A * | 12/1998 | Vu | | H02P 8/12 318/696 |
| 6,009,292 A * | 12/1999 | Jinbo | | G03B 27/526 358/412 |
| 6,175,406 B1 * | 1/2001 | Iizuka | | G03B 27/6285 355/75 |
| 6,268,934 B1 * | 7/2001 | Nishioka | | H04N 1/0402 358/409 |
| 6,462,842 B1 * | 10/2002 | Hamilton | | H04N 1/00236 358/412 |
| 6,693,730 B1 * | 2/2004 | Hsu | | H04N 1/047 358/497 |
| 6,816,288 B1 * | 11/2004 | Hashizume | | H04N 1/0402 358/474 |
| 7,283,862 B1 * | 10/2007 | Slavin | | G01R 33/4835 324/306 |
| 7,327,388 B2 * | 2/2008 | Andersen | | H04N 3/1587 348/219.1 |

(Continued)

*Primary Examiner* — Cheukfan Lee
(74) *Attorney, Agent, or Firm* — Muncy, Geissler, Olds & Lowe, P.C.

(57) ABSTRACT

An image scanning apparatus includes an image capturing unit, a pulse driving unit and a control unit. The image capturing unit captures an image of an object. The pulse driving unit drives the image capturing unit and the object along a scanning direction to move with respect to each other among multiple pulse nodes, so as to scan the object. The control unit is electrically connected to the pulse driving unit and the image capturing unit, and the control unit controls the image capturing unit to capture multiple images of the object between adjacent pulse nodes, so as to synthesize a scanned image corresponding to the object.

12 Claims, 2 Drawing Sheets

(56) References Cited

U.S. PATENT DOCUMENTS

| | | | |
|---|---|---|---|
| 7,742,201 B2* | 6/2010 | Murata | H04N 1/04 358/474 |
| 2001/0012135 A1* | 8/2001 | Kurosawa | H04N 1/0402 358/487 |
| 2007/0024221 A1* | 2/2007 | Yoshihisa | H02P 23/16 318/268 |
| 2008/0174836 A1* | 7/2008 | Yoshihisa | H04N 1/00795 358/497 |
| 2012/0092525 A1* | 4/2012 | Kusaka | H04N 5/2628 348/231.99 |

* cited by examiner

IMAGE SCANNING APPARATUS

BACKGROUND OF THE INVENTION

1. Field of the Invention

The present invention relates to an image scanning apparatus, and more particularly to an image scanning apparatus that can control the resolution of the scanned image.

2. Description of the Prior Art

In order to improve the scanning resolution, a traditional image scanning apparatus usually adopts the programmable logic control servo motor and the precise screw or adopts the piezoelectric motor to achieve the high-precision transmission of the micron (um) level, so as to improve the resolution of the scanned image. Therefore, the traditional image scanning apparatus still must design an additional feedback device for the position detection and speed detection to achieve the accurate control of the position and speed. Moreover, it needs to be coordinated with the expensive precise screw, which leads to the vast and complex assembly space and the expensive production cost.

Thus, the most important goal for now is to provide an image scanning apparatus that has a high resolution.

SUMMARY OF THE INVENTION

The present invention is directed to provide an image scanning apparatus, which uses a control unit to digitally control a capturing frequency of an image capturing unit, so as to improve the resolution of the scanned image.

An image scanning apparatus of one embodiment of the present invention includes an image capturing unit, a pulse driving unit and a control unit. The image capturing unit captures an image of an object. The pulse driving unit drives the image capturing unit and the object along a scanning direction to move with respect to each other among multiple pulse nodes, so as to scan the object. The control unit is electrically connected to the pulse driving unit and the image capturing unit, and the control unit controls the image capturing unit to capture multiple images of the object between adjacent pulse nodes of the multiple pulse nodes, so as to synthesize a scanned image corresponding to the object; wherein an image capturing number of the image capturing unit is digitally controlled by the control unit rather than by the pulse driving unit.

The objective, technologies, features and advantages of the present invention will become apparent from the following description in conjunction with the accompanying drawings wherein certain embodiments of the present invention are set forth by way of illustration and example.

DESCRIPTION OF THE PREFERRED EMBODIMENT

Various embodiments of the present invention will be described in detail below and illustrated in conjunction with the accompanying drawings. In addition to these detailed descriptions, the present invention can be widely implemented in other embodiments, and apparent alternations, modifications and equivalent changes of any mentioned embodiments are all included within the scope of the present invention and based on the scope of the Claims. In the descriptions of the specification, in order to make readers have a more complete understanding about the present invention, many specific details are provided; however, the present invention may be implemented without parts of or all the specific details. In addition, the well-known steps or elements are not described in detail, in order to avoid unnecessary limitations to the present invention. Same or similar elements in Figures will be indicated by same or similar reference numbers. It is noted that the Figures are schematic and may not represent the actual size or number of the elements. For clearness of the Figures, some details may not be fully depicted.

Figure 1:
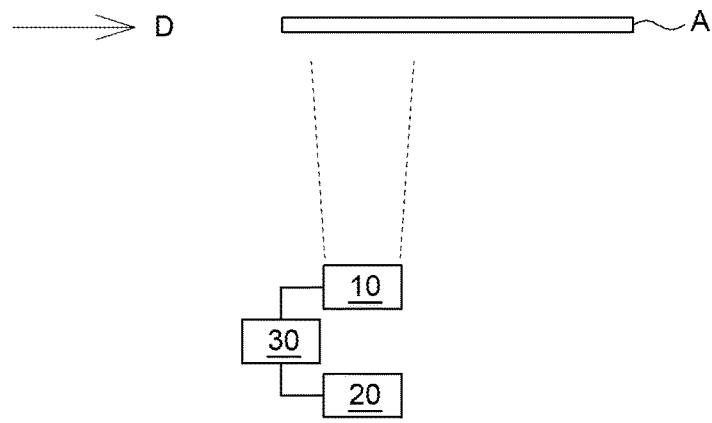
FIG. 1 is a schematic view, showing an image scanning apparatus of one embodiment of the present invention.
Figure 2:
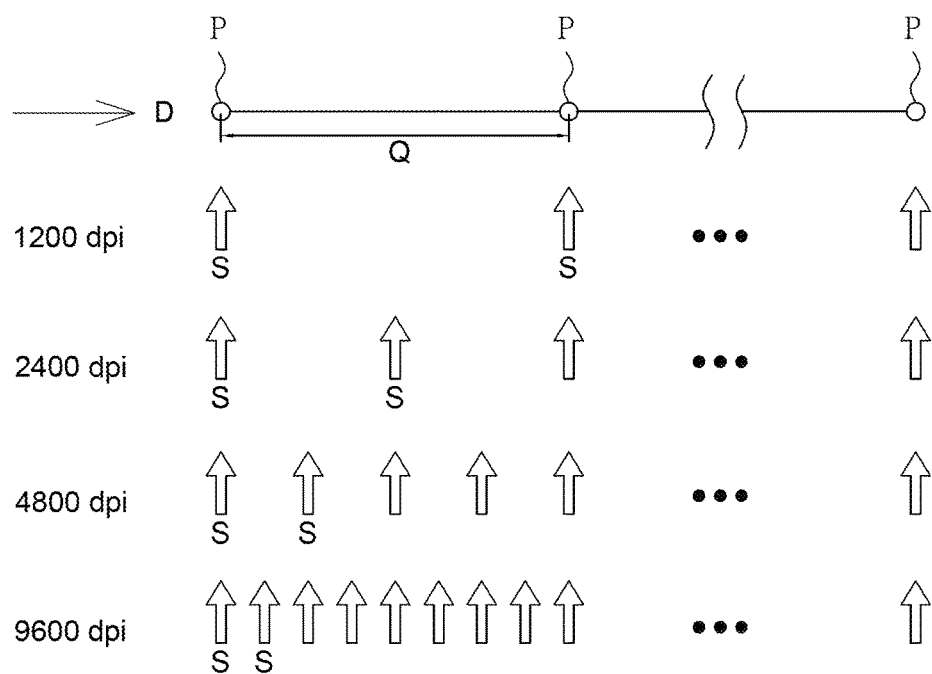
FIG. 2 is a schematic view, showing the working principle of one embodiment of the present invention.

Referring to FIG. 1 and FIG. 2 together, an image scanning apparatus of one embodiment of the present invention includes an image capturing unit 10, a pulse driving unit 20 and a control unit 30. The image capturing unit 10 captures an image of an object A. In one embodiment, the image capturing unit 10 includes a Line-Scan light-sensing device or an Area-Scan light-sensing device. In one embodiment, the image capturing unit 10 includes a charge coupled device (CCD) or a complementary metal oxide semiconductor (CMOS) sensor and may be coordinated with a single lens or a lens set, which may not be a limitation. In another embodiment, the image capturing unit 10 includes a contact image sensor (CIS), which only needs multiple small rod lens for imaging and is closer to the object A, so that a light path of the irradiating light is shortened significantly and the contrast of the scanned image is improved directly.

The pulse driving unit 20 drives the image capturing unit 10 and the object A along a scanning direction D to move with respect to each other among multiple pulse nodes P, so as to scan the object A. In one embodiment, the pulse driving unit 20 may be a stepper motor. It may be understood that the pulse driving unit 20 is a driving device that rotates in a particular angle gradually through the pulse control and usually adopts the open loop control mode for processing. Therefore, the pulse driving unit 20 may achieve the accurate control of the position and speed without a feedback device for the position detection and speed detection and have an excellent stability. That is, between any two adjacent pulse nodes P, the corresponding moving distance of the image capturing unit is the same and is controlled accurately and stably, as shown in FIG. 2. It is needed to be explained that the pulse driving unit may accurately control the driving position and speed without a feedback device for the position detection and speed detection and a coordinated expensive precise screw. Therefore, an image scanning apparatus of the present invention may save the vast and complex assembly space to achieve the design effect of lightweight, and reduce the production cost.

Continued with the foregoing descriptions, the control unit 30 is electrically connected to the pulse driving unit 20 and the image capturing unit 10, and the control unit 30 controls the image capturing unit 10 to capture multiple images of the object A between adjacent pulse nodes P, so as to synthesize a scanned image corresponding to the object A.

It may be understood that, in the scanning direction D, every time the image capturing unit 10 captures the image of the object A, one pixel of the scanned image may be increased, that is, an image capturing number S of the image capturing unit 10 will determine the number of the pixels of the scanned image. In other words, the image capturing number S of the image capturing unit 10 within a unit distance is the number of the pixels of the scanned image within a unit distance, which is the so-call resolution (dpi, dot per inch). For example, if the number for the image capturing unit 10 to capture the image of the object is more, the higher resolution of the scanned image may be obtained.

As to the prior-art image scanning apparatus, the image capturing unit driven by the pulse driving unit only captures the image of the object one time at each pulse node. As shown in FIG. 2, in a comparative case, the image capturing unit 10 only captures the image of the object A one time at each pulse node P, and a node distance Q between the pulse nodes P is 21.2 μm. That is, in the scanning direction D, the image capturing unit 10 captures the image one time every average distance of 21.2 μm, and therefore, the resolution of the scanned image may be calculated to be 1200 dpi. It may be understood that the resolution of the existing image scanning apparatus will be restricted by the node distance Q between adjacent pulse nodes P determined by the pulse driving unit 20, so that a higher resolution of the scanned image may not be provided. If a higher resolution of the scanned image is desired, the node distance Q between adjacent pulse nodes P must be shorten, which can be realized only by adopting the high-precision driving unit such as the precise screw or the piezoelectric motor that will lead to the vast and complex assembly space and the expensive production cost.

Continued to refer to FIG. 1 and FIG. 2, the working principles and the effects of the prior art and the present invention will be described below. In order to effectively improve the resolution of the scanned image, the control unit 30 of the image scanning apparatus of the present invention may control the image capturing unit to capture multiple images of the object A between adjacent pulse nodes P, i.e., increasing the image capturing number S of the image capturing unit 10. In one embodiment, in addition to the one-time capture of the image of the object A at the pulse node P, the image capturing unit 10 of the image scanning apparatus further captures the image one time before reaching the next adjacent pulse node P, so as to obtain a higher resolution. As shown in FIG. 2, for example, the image capturing unit 10 captures the image two times totally from the current pulse node P and before a next adjacent pulse node P. The node distance Q between adjacent pulse nodes P is still 21.2 μm, but the image capturing unit 10 captures the image one time every average distance of 10.6 μm. Thus, the resolution of the scanned image may be calculated to be 2400 dpi. In other words, the image capturing number S of the image capturing unit 10 is digitally controlled by the control unit 30, rather than restricted by the node distance Q of the pulse driving unit 20. In this embodiment, within the same node distance Q in the scanning direction D, the image capturing unit 10 may capture double number of the image, so that a double resolution (2400 dpi) of the scanned image may be realized.

Continued with the foregoing descriptions and continued to refer to FIG. 2, in other embodiments, if the image capturing number S within each node distance Q is increased, then the resolution of the scanned image along the scanning direction D may be improved, e.g., realizing the resolution of 4800 dpi, 9600 dpi or more. In other words, a quotient of the image capturing number S of the image capturing unit 10 between adjacent pulse nodes P divided by the node distance Q between adjacent pulse nodes P is equal to a scanning resolution T of the image scanning apparatus, which mathematical relationship meets the following formula:

$$S/Q = T(\text{dpi}) \qquad (1).$$

In some embodiments, if the same pulse driving unit is used, that is, the node distance Q between adjacent pulse nodes P is constant, then the scanning resolution T of the image scanning apparatus will be proportional to the image capturing number S of the image capturing unit between adjacent pulse nodes P. In the above-mentioned comparative case, if the image capturing unit only captures the image one time at each pulse node P, the obtained scanning resolution of the image scanning apparatus is 1200 dpi as described above, which will not be described again here. In one embodiment, if a user wants to realize a scanning resolution of 4800 dpi, the user simply increases the image capturing number S within the same node distance Q to be 4 and a high-resolution scanned image having a scanning resolution of 4800 dpi may be obtained. In another embodiment, if the user wants to realize a scanning resolution of 9600 dpi, the user simply increases the image capturing number S within the same node distance Q to be 8 and a high-resolution scanned image having a scanning resolution of 9600 dpi may be realized.

In other embodiment, according to the above formula (1), if the image capturing number S between adjacent pulse nodes P of the image capturing unit is constant and a more precise pulse driving unit is adopted to realize a shorter node distance Q, then a higher scanning resolution may be obtained. Those skilled in the art may modify and change, and may not be limited to this.

It may be understood that if the time that the image capturing unit needs to capture multiple images between adjacent pulse nodes is more than the time that the image capturing unit needs to move between adjacent pulse nodes, then it may not work normally. Thus, those skilled in the art may reduce the moving speed of the image capturing unit between adjacent pulse nodes, so that the moving time thereof may be increased. For example, the control unit further includes a speed adjusting unit (not shown) to reduce the moving speed of the image capturing unit between adjacent pulse nodes, so that the moving time of the image capturing unit between adjacent pulse nodes may be increased to allow multiple images to be captured and the resolution of the scanned image along the scanning direction may be improved. Those skilled in the art may modify and change, and may not be limited to this.

Figure 3:
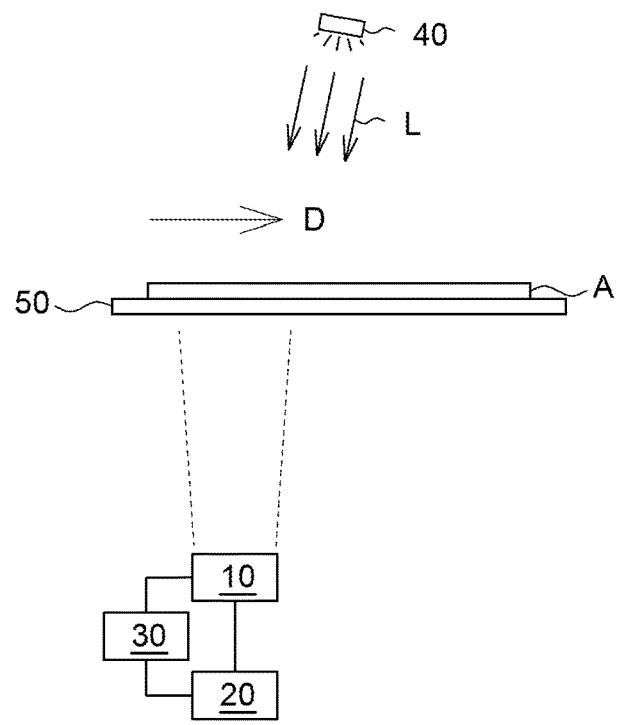
FIG. 3 is a schematic view, showing an image scanning apparatus of another embodiment of the present invention.
Figure 4:
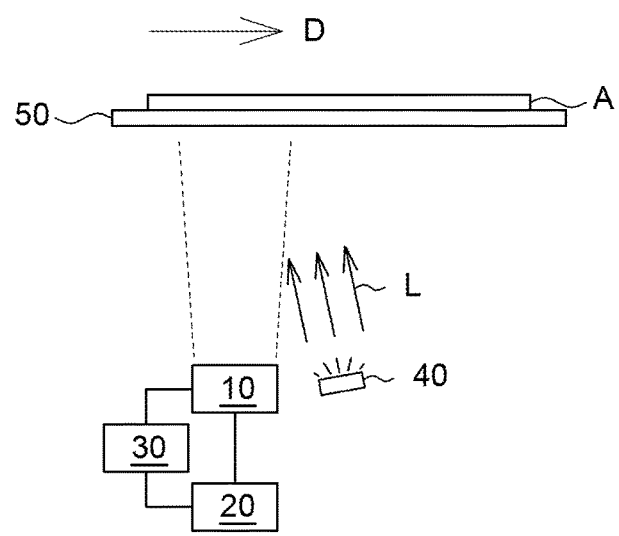
FIG. 4 is a schematic view, showing an image scanning apparatus of yet another embodiment of the present invention.

It is needed to be explained that the image scanning apparatus of the present invention may not limit the form of the scanning light source thereof and the light path. Referring to FIG. 3 and FIG. 4 together, in one embodiment, the image scanning apparatus further includes a scanning light source 40 to provide a light L to irradiate the object A. In one embodiment, the scanning light source 40 and the image capturing unit 10 are disposed at opposite sides of the object A respectively as shown in FIG. 3, and the image capturing unit 10 receives the light L transmitting through the object A, so as to realize a transmission image scanning apparatus, which is not a limitation. In another embodiment, the scanning light source 40 and the image capturing unit 10 are disposed at the same side of the object A respectively as shown in FIG. 4, and the image capturing unit 10 receives the light L reflected by the object A, so as to realize a reflecting image scanning apparatus. In another embodiment, the image scanning apparatus further includes a platform 50 having a transparent material, and the object A is disposed on the platform 50. For example, the scanning light source 40 and the image capturing unit 10 are disposed at opposite sides of the platform 50 respectively, so as to realize a transmission image scanning apparatus. Or, the scanning light source 40 and the image capturing unit 10 are disposed at the same side of the platform 50 respectively, so as to realize a reflecting image scanning apparatus. In one embodiment, the pulse driving unit 20 is connected to the platform 50, and the driving unit drives the platform 50 to move along the scanning direction D, so as to scan the object A. In another embodiment, the pulse driving unit 20 is connected to the image capturing unit 10 to drive the image capturing unit 10 to scan the object A. In yet another embodiment, the scanning light source 40 that is connected to the pulse driving unit 20 through a connecting rod component may scan the object A synchronously with the image capturing unit 10. Those skilled in the art may modify and change, and may not be limited to this.

To sum up the foregoing descriptions, the image scanning system of the present invention uses the control unit to digitally control the capturing frequency of the image capturing unit, so as to improve the resolution of the scanned image. Therefore, the image scanning system of the present invention may achieve the high-precision transmission of the micron level through a more simple mechanical structure to realize a multi-times resolution, and may provide a user to adjust the required resolution of the scanned image by himself. In addition, compared with the traditional high-precision image scanning apparatus, the image scanning apparatus of the present invention may save the vast and complex assembly space to achieve the design effect of lightweight, and reduce the production cost.

What is claimed is:

1. An image scanning apparatus comprising:
   an image capturing unit;
   a pulse driving unit; and
   a control unit electrically connected to the pulse driving unit and the image capturing unit; wherein the image capturing unit captures an image of an object, the pulse driving unit drives the image capturing unit and the object along a scanning direction to move with respect to each other among multiple pulse nodes so as to scan the object, and the control unit controls the image capturing unit to capture multiple images of the object between adjacent pulse nodes of the multiple pulse nodes, so as to synthesize a scanned image corresponding to the object; wherein an image capturing number of the image capturing unit is digitally controlled to capture the multiple images by the control unit rather than by the pulse driving unit.

2. The image scanning apparatus according to claim 1, wherein the pulse driving unit is a stepper motor.

3. The image scanning apparatus according to claim 1, wherein a node distance between the adjacent pulse nodes is of a micron (um) level.

4. The image scanning apparatus according to claim 1, wherein a quotient of an image capturing number of the image capturing unit between the adjacent pulse nodes divided by a node distance between the adjacent pulse nodes is equal to a scanning resolution of the image scanning apparatus.

5. The image scanning apparatus according to claim 1, wherein a quotient of an image capturing number of the image capturing unit between the adjacent pulse nodes divided by a node distance between the adjacent pulse nodes is equal to or more than 4800 dpi.

6. The image scanning apparatus according to claim 1, wherein a quotient of an image capturing number of the image capturing unit between the adjacent pulse nodes divided by a node distance between the adjacent pulse nodes is equal to or more than 9600 dpi.

7. The image scanning apparatus according to claim 1, further comprising a scanning light source to provide a light to irradiate the object.

8. The image scanning apparatus according to claim 7, wherein the scanning light source and the image capturing unit are disposed at opposite sides of the object respectively.

9. The image scanning apparatus according to claim 7, wherein the scanning light source and the image capturing unit are disposed at the same side of the object respectively.

10. The image scanning apparatus according to claim 1, wherein the image capturing unit comprises a charge coupled device, a complementary metal oxide semiconductor sensor, or a contact image sensor.

11. The image scanning apparatus according to claim 1, wherein the image capturing unit comprises a Line-Scan light-sensing device or an Area-Scan light-sensing device.

12. The image scanning apparatus according to claim 1, further comprising a platform having a transparent material, wherein the object is disposed on the platform.

* * * * *